United States Patent [19]

Cetrangolo

[11] Patent Number: 4,699,564
[45] Date of Patent: Oct. 13, 1987

[54] STONE TURNING APPARATUS WITH SWING TRANSFER

[76] Inventor: D. L. Cetrangolo, Towne St., Montpelier, Vt. 05602

[21] Appl. No.: 877,015

[22] Filed: Jun. 20, 1986

[51] Int. Cl.$^4$ .............................................. B65G 57/08
[52] U.S. Cl. .................................. 414/765; 414/777; 198/404; 125/35
[58] Field of Search ................ 198/404; 414/764, 765, 414/766, 777; 125/12, 13 R, 35

[56] References Cited

U.S. PATENT DOCUMENTS

| | | | |
|---|---|---|---|
| 763,307 | 6/1904 | Mills | 414/777 |
| 2,865,516 | 12/1958 | Hedderich | 414/765 |
| 3,089,598 | 5/1963 | Temple | 414/777 |
| 3,184,079 | 5/1965 | Buccicone | 414/764 |
| 4,436,078 | 3/1984 | Bourke | 414/764 |

Primary Examiner—Harold D. Whitehead
Attorney, Agent, or Firm—Donald W. Meeker

[57] ABSTRACT

Spaced parallel circular tracks rotate 180 degrees on roller bearings. Matching openings through one edge of each track serve to admit a stone or heavy object into a receiving slot. Parallel roller conveyors line the top and bottom faces of the slot. A pivoting swing with a platform across the inside of the slot transfers the stone from one face to the other automatically when the apparatus is rotated. The center of gravity of the loaded turning apparatus coincides with the center of rotation thereby requiring very little turning power. A manual handle or motor drive shaft rotates the gear train to turn the apparatus. Transverse rollers permit entry and exit of the stone at opposite points on the circular track. Longitudinal rollers permit entry and exit of the stone from the same or opposite sides of the apparatus.

8 Claims, 5 Drawing Figures

STONE TURNING APPARATUS WITH SWING TRANSFER

BACKGROUND OF THE INVENTION

1. Technical Field

The present invention relates to turning apparatus for inverting heavy objects such as stone monuments, and in particular to stone turning apparatus having a trapeze-like swing for transferring the stone from a lower to an upper roller conveyor during 180 degree rotation.

2. Background Art

Most prior art turning apparatus for heavy objects, such as stone monuments, seem to fall within two categories: having either no control means for transfer, thereby relying upon a narrow transfer space with limited size capacity and danger of breakage, or a clamping means for holding the stone, thereby adding additional cost and time to the operation and somewhat limiting the size capacity of the apparatus.

Prior art devices which transfer the stone laterally in addition to turning the stone require considerable power mechanisms for moving the heavy objects and considerable space to carry out the operation.

Devices which move the stone in an arc which deviates from the center of gravity of either the object or the apparatus require considerable power for moving the heavy objects.

Apparatus relying on belt drives in rotating heavy stones or other objects run the considerable risk of slipping in the process causing undesirable results.

DISCLOSURE OF THE INVENTION

Providing an open trapeze-like swing as the perpendicular end support between parallel spaced upper and lower roller conveyors in the turning apparatus enables the stone to be gently moved automatically from one roller conveyor to the other as a natural action during inversion of the stone. The trapeze-like swing saves time because it works automatically and is less expensive to install than clamping mechanisms. In addition it allows a relatively large space between the roller conveyors thereby building in the capability for handling a wide range of sizes of stone or other heavy objects to be inverted.

In-place rotation of the apparatus about its own axis enables the apparatus to be built with a simple turning mechanism occupying a minimal amount of space.

Aligning the center of gravity of the apparatus with the axis of rotation and the average center of gravity of the stone with the center of gravity of the apparatus provides a turning apparatus which may be easily rotated manually or with minimal mechanical assistance.

A cog wheel turning mechanism interacting with a notched circular track on roller bearings provides a positive non-slipping pulling force for rotation with a minimal motor and/or a handle operating the cog wheel through a chain drive.

BRIEF DESCRIPTION OF THE DRAWINGS

These and other details and advantages of my invention will be described in connection with the accompanying drawings which are provided merely by way of illustration and not in limitation of the invention, and in which drawings.

BEST MODE FOR CARRYING OUT THE INVENTION

Figure 1:
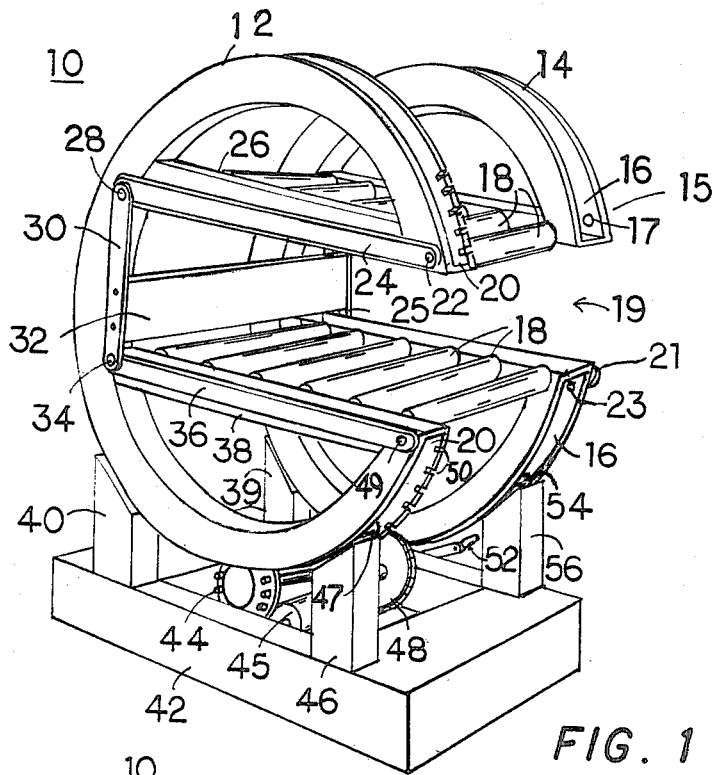
FIG. 1 is a perspective view of the stone turning apparatus having transverse rollers for receiving a stone through the end opening.

In FIG. 1 the stone turning apparatus 10 comprises two spaced parallel circular tracks 12 and 14 having a receiving slot 19 formed by matching openings through each of the two circular tracks. Frame members 26 and 38 support the circular tracks and retain a series of rollers 18 extending from one circular track 12 to the other 14, with the two series of rollers forming two interior opposing parallel faces of the receiving slot. An outer edge of each circular track comprises a three-sided channel configuration forming, in circular track 12, a circular slot 20 which rides on a roller bearing 47 on support 46 and a similar roller bearing (not visible) on support 40. The external slot 16 on circular track 14 rides on a roller bearing 54 on support 56 and a similar roller bearing (not visible) on support 39.

Attached to each circular track by pivots 22 and 49 on track 12 and pivots 17 and 23 on track 14 at the two sides of the receiving slot opening, a swing-like transfer frame formed by two swing arms 24 and 38 with pivotally attached cross member 30 on track 12 and swing arms 15 and 21 with pivotally attached cross member 26 on track 14. Secured between the two cross members 25 and 30, a connecting support member 32 serves as the means for stopping the motion of a stone 60 (in FIG. 2) or other heavy object rolled into the receiving slot 19 and further serves as a moving platform to transfer the stone from one roller face to the other as the circular frames are rotated to invert the stone 180 degrees, as seen in FIGS. 2–4.

Figure 3:
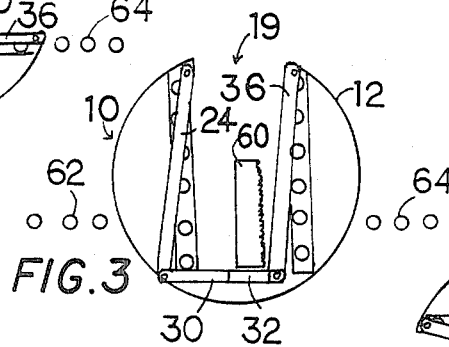
FIG. 3 is a diagrammatic elevational view of the invention in the turning mode after passing the half turn point with the swing beginning to transfer the stone from one roller face to another.

In turning as the stone passes the vertical position, shown in FIG. 3, the swing-like transfer frame gently swings the stone from the receiving face having frame 38 to the discharging face having frame 26 automatically using the force of gravity. A wide range of sizes of stone or other heavy objects may be transferred in this fashion. Pivot connections 28 and 34 between the cross member 30 and the swing arms 24 and 38 allow the connecting support member 32 to maintain a substantially horizontal orientation during transfer, so that the stone is substantially transferred in a vertical standing position between substantially vertical faces with no tipping of the stone.

The circular tracks are positioned on the bearings and supports so that the center of gravity of the circular track structure substantially coincides with the center of rotation of the circular track structure when loaded so that very little force is required to turn the apparatus. Turning may be accomplished in a number of different ways. In FIG. 1 a wheel with protruding cogs 44 rotates to turn the circular tracks by interaction of each cog with one of a series of slots 50 along one edge of a circular track 12. Power for the cog wheel is transmitted through a drive chain which may be activated by a link chain drive wheel 48 turned manually be a handle 52 or by a small motor 45. The power mechanisms may be mounted within a base structure 42 which may be moved to the desired location for turning operations.

Figure 2:
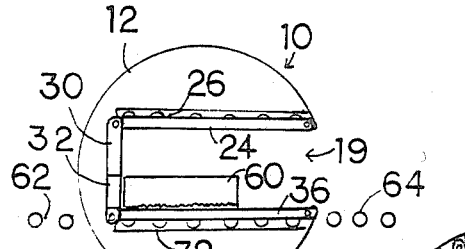
FIG. 2 is a diagrammatic elevational view of the invention in the receiving position having been loaded with a stone from a first roller conveyor.
Figure 4:
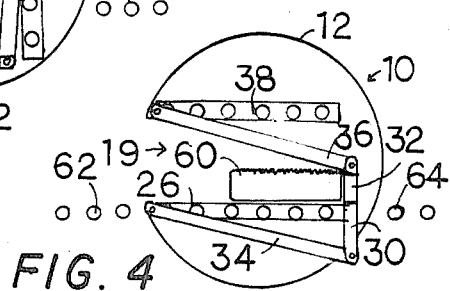
FIG. 4 is a diagrammatic elevational view of the invention after turning the stone, which has been transferred from one roller face to the other, and is now ready to be rolled out onto a second roller conveyor.

In the preferred embodiment, as seen in FIGS. 2–4, the turning apparatus of the invention 10 may be positioned in alignment with a normal roller conveyor for inversion of a stone being transported along in the same direction from a first conveyor section 64 to a second conveyor section 62, inverting the stone in the transfer from the first to the second.

Figure 5:
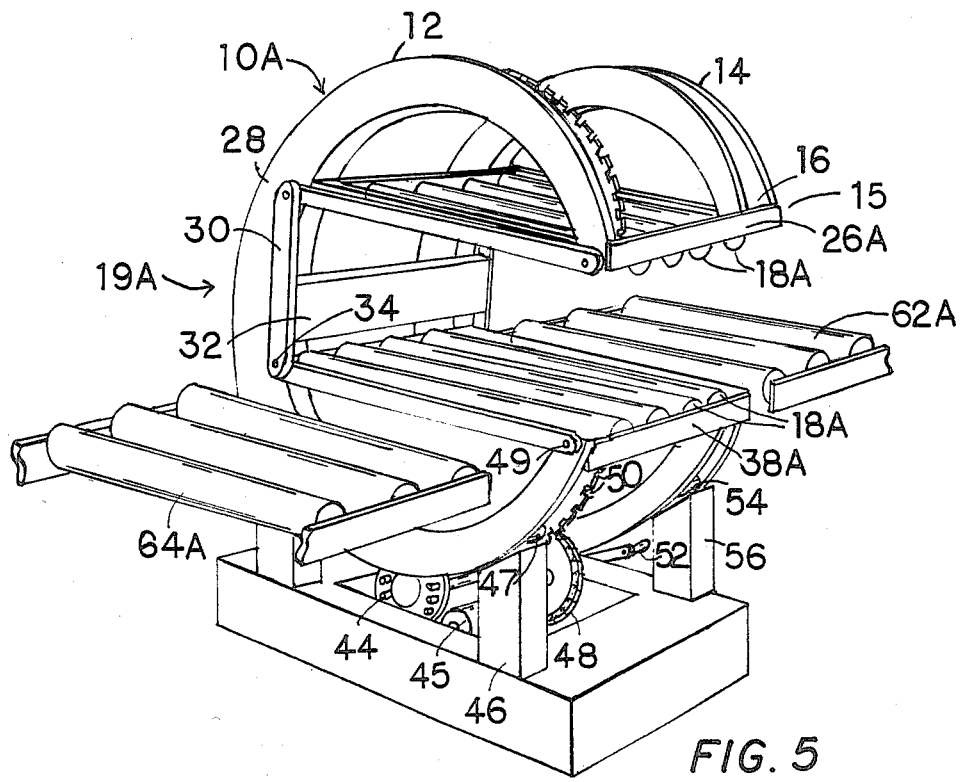
FIG. 5 is a perspective view of an alternate embodiment of the invention having longitudinal rollers for receiving stones fed from the side of the invention.

In FIG. 5 an alternate embodiment of the invention 10A comprises a turning apparatus haviang roller faces 26A and 38A with rollers 18A extending longitudinally within the receiving slot 19A. Such a configuration of the rollers at a right angle to the preferred embodiment enables a stone or other object to be rolled into the side of the turning apparatus, the stone inverted and then rolled back out on the same conveyor 64A or on a conveyor 62A on the opposite side of the turning apparatus.

The entire structure should be fabricated of structurally rigid material, such as structural steel, to support the weight of heavy stones or other objects.

In use a stone marker may be polished on one face and rolled along the conveyor into the turning apparatus with the finished face up. Then the stone may be turned 180 degrees to expose the unfinished face for polishing. The stone is then rolled into position for polishing the opposite face.

It is understood that the preceding description is given merely by way of illustration and not in limitation of the invention and that various modifications may be made thereto without departing from the spirit of the invention as claimed.

I claim:

1. A turning apparatus for heavy objects having 180 degree turning capability with unimpeded access and egress of the objects in the apparatus, wherein the apparatus comprises:

a rigid rotatable support frame formed by two spaced circular tracks secured together by a lateral frame structure, wherein each circular track rolls on a pair of spaced low-friction roller bearings supporting the circular tracks to enable relatively easy stationary rotation of the circular tracks about a center of gravity of the support frame, and wherein a portion of an edge of the support frame is provided with an opening through the circular tracks forming a receiving slot from the opening edge of the circular tracks to an opposite closed edge of the circular tracks, wherein the opening is bordered by rigid straight frame members from the opening edge to the opposite closed edge of each circular track and interconnected rigid frame members between the two circular tracks define two opposing parallel interior faces of the receiving slot;

a parallel series of rollers secured transversely between the two circular tracks along each of the two interior parallel faces of the receiving slot;

a swing-like transfer frame aligned with the receiving slot on each of the two circular tracks, wherein each transfer frame comprises a pair of parallel swing members each pivotally attached to the circular track at one side of the opening into the receiving slot and a connecting support member pivotally attached to each opposite end of each swing member thereby spanning the edge of the receiving slot at a closed end of the receiving slot, and interconnecting the two transfer frames a flat platform rigidly secured to each of the two connecting support members spanning the width of the receiving slot between the two circular tracks to form a stop at the closed end of the receiving slot, so that when the receiving slot is positioned horizontally in alignment with an external series of rollers and a heavy object from the external rollers is rolled onto a bottom face of the receiving slot on an interior series of receiving rollers until the object contacts the platform, and the circular tracks are rotated turning the receiving slot 180 degrees, the object will automatically swing on the platform from the receiving rollers to the opposite face of the receiving slot onto the other interior series of rollers; and a means for rotating the circular tracks about the center of gravity of the support frame.

2. The invention of claim 1 wherein the means for rotating the circular tracks comprises a cog wheel positioned in contact with an outer edge of one of the circular tracks, wherein the cog wheel interacts with a series of notches in the edge of the circular track and the cog wheel is rotated by a gear chain connected to a turning means.

3. The invention of claim 2 wherein the turning means comprises a crank turned manually.

4. The invention of claim 2 wherein the turning means comprises a motor driven gear.

5. The invention of claim 2 wherein the turning means comprises a chain drive on a sprocket linked to the cog wheel.

6. The invention of claim 1 wherein the interior series of rollers are positioned with the rollers spanning the width of the receiving slot between the two circular tracks thereby providing access and egress of the objects through the receiving slot opening in the edge of the circular tracks.

7. The invention of claim 1 wherein the interior series of rollers are positioned with the rollers spanning the length of the receiving slot from the open end of the receiving slot to the closed end of the receiving slot, thereby providing access and egress of the objects through the sides of the receiving slot perpendicular to the circular tracks.

8. The invention of claim 1 wherein each circular track comprises a channel with side edges maintaining the circular track in alignment with the roller bearings.

* * * * *